(12) United States Patent
Floro (10) Patent No.: US 7,255,190 B1
(45) Date of Patent: Aug. 14, 2007

(54) PORTABLE FUEL SYSTEM

(76) Inventor: Kent D. Floro, 5545 Erie St., P.O. Box 285, Lacarne, OH (US) 43439

( * ) Notice: Subject to any disclaimer, the term of this patent is extended or adjusted under 35 U.S.C. 154(b) by 526 days.

(21) Appl. No.: 10/960,474

(22) Filed: Oct. 6, 2004

Related U.S. Application Data (60) Provisional application No. 60/512,664, filed on Oct. 20, 2003.

(51) Int. Cl.
*B62P 3/22* (2006.01)
(52) U.S. Cl. .................. 180/219; 280/833; 220/4.16; 224/413
(58) Field of Classification Search ............... 180/219, 180/225; 280/833, 835, 832; 220/4.14, 220/4.16, 4.15, 413, 414, 430; 222/92
See application file for complete search history.

(56) References Cited

U.S. PATENT DOCUMENTS

| 4,175,630 | A | * | 11/1979 | Fleisher et al. | 180/225 |
| 4,359,233 | A | * | 11/1982 | Jackson et al. | 224/413 |
| 4,385,676 | A | | 5/1983 | Yoshimura | |
| 4,396,084 | A | * | 8/1983 | Yoshimura et al. | 180/219 |
| 4,469,190 | A | * | 9/1984 | Yamaguchi | 180/219 |
| 4,577,719 | A | | 3/1986 | Nomura et al. | |

* cited by examiner

*Primary Examiner*—Tony Winner
(74) *Attorney, Agent, or Firm*—Emch, Schaffer, Schaub & Porcello Co. L.P.A.

(57) ABSTRACT

A portable fuel system for a motorcycle or similar vehicle includes an inner bag with opening for receiving and dispensing fuel, a first outer bag formed of fire retardant material and a second outer bag having connectors for securing the portable fuel system to the motorcycle or other vehicle.

34 Claims, 8 Drawing Sheets

PORTABLE FUEL SYSTEM

CROSS REFERENCE TO RELATED APPLICATION

This application is based upon and claims the benefit of Provisional Application No. 60/512,664 filed Oct. 20, 2003.

BACKGROUND OF THE INVENTION

The present invention is directed to a portable fuel system and more specifically to a fuel system which may be utilized on a motorcycle, snowmobile or similar vehicle to extend its mileage range over the range that is available from a standard built-in fuel tank with which motorcycles, snowmobiles or the like are equipped. The portable fuel system of the present invention may be mounted on or in close proximity to the standard built-in fuel tank of such vehicles.

The prior art discloses various types of auxiliary tanks and reserve fuel tank systems for use with motorcycles and other motor vehicles. For example, U.S. Pat. No. 4,385,676 discloses a motorcycle with a main fuel tank Tm and an auxiliary fuel tank Ts for storing an auxiliary fuel. A seat separates the main fuel tank and the auxiliary fuel tank. A switch cock V is positioned such that the rider of the motorcycle can easily reach it to change from one tank to the other for delivery of fuel to the engine.

U.S. Pat. No. 4,577,719 discloses a motorcycle fuel system with flow from a main tank through a lower auxiliary tank to its engine.

The auxiliary fuel tanks in the above-identified patents are rigid containers which are permanently mounted on the motorcycles. In contrast, the system of the present invention utilizes a bag and other components which are flexible and can be collapsed and readily changed from use on one vehicle to use on another vehicle. Additionally, it can be readily secured to and removed from one vehicle and placed on another vehicle. For example, a purchaser could easily remove it from his motorcycle and fasten it for use with his snowmobile.

SUMMARY OF THE INVENTION

The portable fuel system utilizes a multi-component storage container which includes (1) an inner DOT approved gasoline bladder bag, (2) a first outer fire retardant cloth bag utilizing material such as Nomex® and (3) a second outer puncture and abrasion resistant armor sleeve or bag manufactured of a suitable material such as Kevlar® which has means associated therewith for readily attaching the assembled components to a motorcycle or other vehicle. Both Nomex® and Kevlar® are manufactured by duPont.

A flexible fuel line delivers fuel from the storage container of the present invention to a fuel line extending therefrom to the carburetor. The flexible fuel line is directly connected to the fuel containing bladder bag and extends through apertures in the first outer fire retardant cloth bag and the second outer puncture and abrasion resistant armor sleeve. The flexible fuel line is provided with a shut-off valve in close proximity to the bladder bag and extends to an end on which is mounted a quick connect/disconnect check valve engaged to an inlet fixture mounted on the fuel line of the vehicle leading to the carburetor.

Among the advantages of the portable fuel system of the present invention is its collapsibility as the fuel is consumed therefrom. The collapsibility of the bladder bag permits it to deliver fuel to the engine without the necessity of providing a vent as is required in a rigid tank from which fuel is dispensed. As a result of such collapsibility, there is no significant build-up of fuel vapor with the result that the chance of explosion is minimal or non-existent if the bag were puncture for example by a stray bullet. In contrast, a rigid tank from which a major amount of fuel has been dispensed will have explosive vapors in that portion of the tank above the fuel which presents the risk of explosion upon puncturing by a bullet or other hot object. Additionally, both the bladder bag and the fire resistant cloth bag are collapsible and can be folded and stored in a small space when not in use. The feature of the first outer bag being formed of fire retardant material also contributes to minimizing risks in the event the bladder bag is punctured.

In addition to being readily adapted to for use with motorcycles, all-terrain vehicles, jet skis, snowmobiles and boats, it can also be adapted for use with small military surveillance aircraft where weight distribution is important and explosion resistance from bullets a priority.

The second outer puncture resistant and abrasion resistant bag is provided with means for readily securing and detaching the system from the motorcycle or other vehicle. Such means may include magnets for engagement with a metal portion of the motorcycle or other vehicle and belts with appropriate loops and fastening devices and/or a combination of both.

DETAILED DESCRIPTION OF THE PREFERRED EMBODIMENTS

Referring to FIGS. 1-4, there is shown the inner component of the system, namely, a DOT approved gasoline bladder bag 10 having an inlet opening 12 for receiving gasoline or other fuel and an outlet opening 14 to which is connected a flexible plastic or other suitable material hose 16 for delivering fuel from the bladder bag 10 to the engine of the vehicle. The bladder bag 10 is formed of polyurethane which may be a clear material or of polyurethane with nylon reinforcing which may be opaque. Preferably, the hose 16 is polyurethane. The hose 16 extends to an outlet end on which is mounted a dual shut-off, quick disconnect coupling 36 such as one sold by Motion Pro, Inc. of San Carlos, Calif., as its Part No. P12-038 or 18-0694 or other coupling well known in the art.

The inlet opening 12 has a nozzle 19 with a threaded neck 22 for introducing fuel into the bladder bag 10 and a threaded closure C engaged to the neck 22 for sealing the bladder bag 10. The bladder bag has an upper wall 21 and a lower wall 23 (see FIG. 3). The bladder bag 10, as viewed looking at the upper wall 21, is generally rectangular in shape and has first and second ends 13 which are heat sealed together and first and second edges 15 extending between the ends 13 which are pleated to form opposing, inwardly extending pleats 17.

If desired, a stiffening member 25 may be adhered to the inner surface of each of the upper wall 21 and lower wall 23. Preferably the stiffening members 25 do not extend laterally to the pleats 17, but rather end at edge portions 25A spaced from the pleats 17 to avoid interfering with the opening and closing thereof. Longitudinally, the stiffening members 25 terminate at end portions 25B (indicated by the phantom lines in FIGS. 1 and 2) spaced from the ends 13. This permits the opposing sheets of polyurethane to be adhesively or heat welded together. With this construction, the bladder bag 10 will expand to a thickness to an extent permitted by the opening of the pleats 17 when filled with fuel but may collapse such that the upper wall 21 and lower wall 23 collapse toward one another with their respective stiffening members 25 contacting one another. If desired, the stiffening members 25 may be omitted in which case the upper wall 21 will contact the lower wall 24 upon dispensing all of the contents of fuel from the bladder bag 10.

Figure 1:
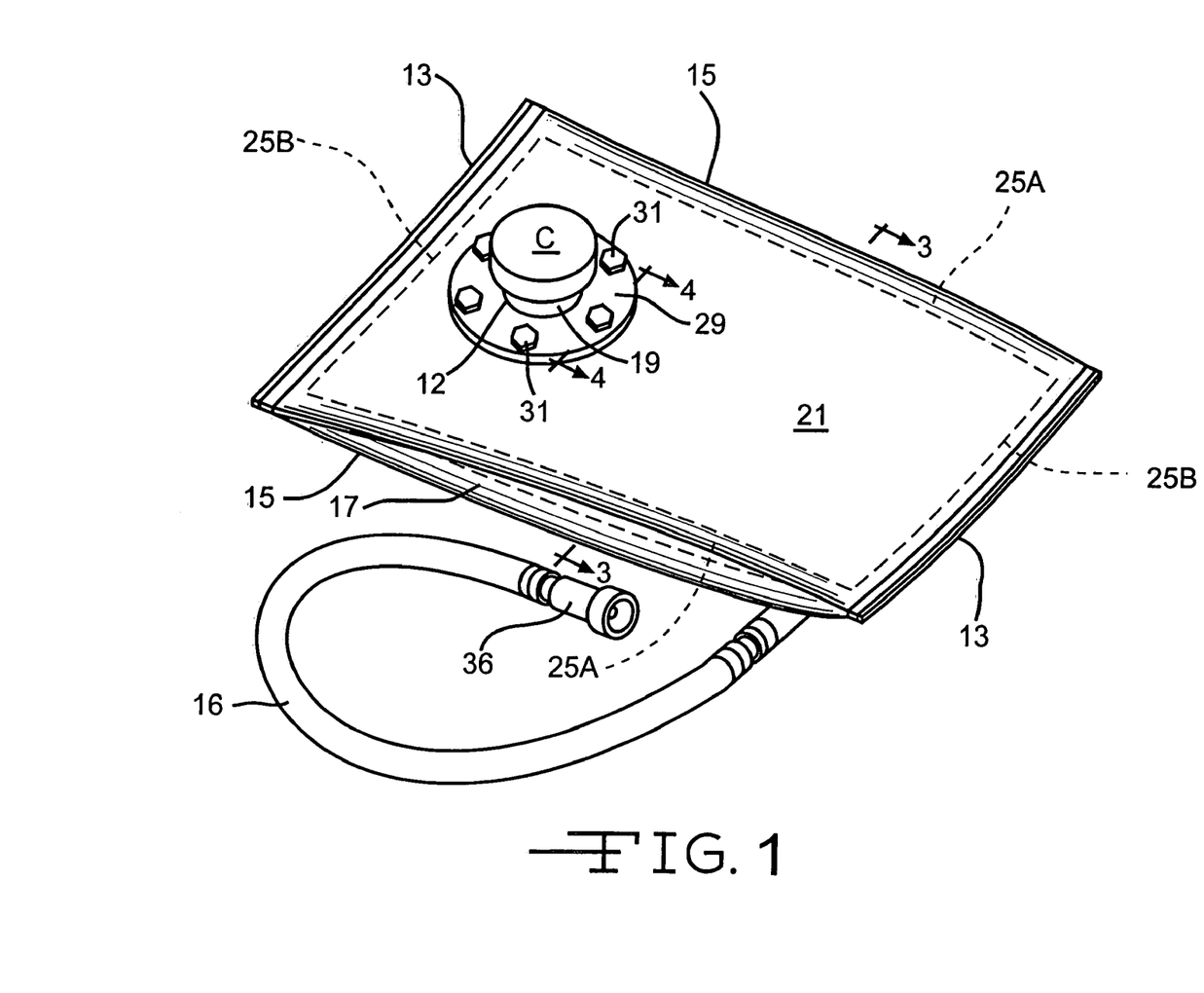
FIG. 1 is a perspective view of the inner bladder bag component of the present invention taken from one side.
Figure 2:
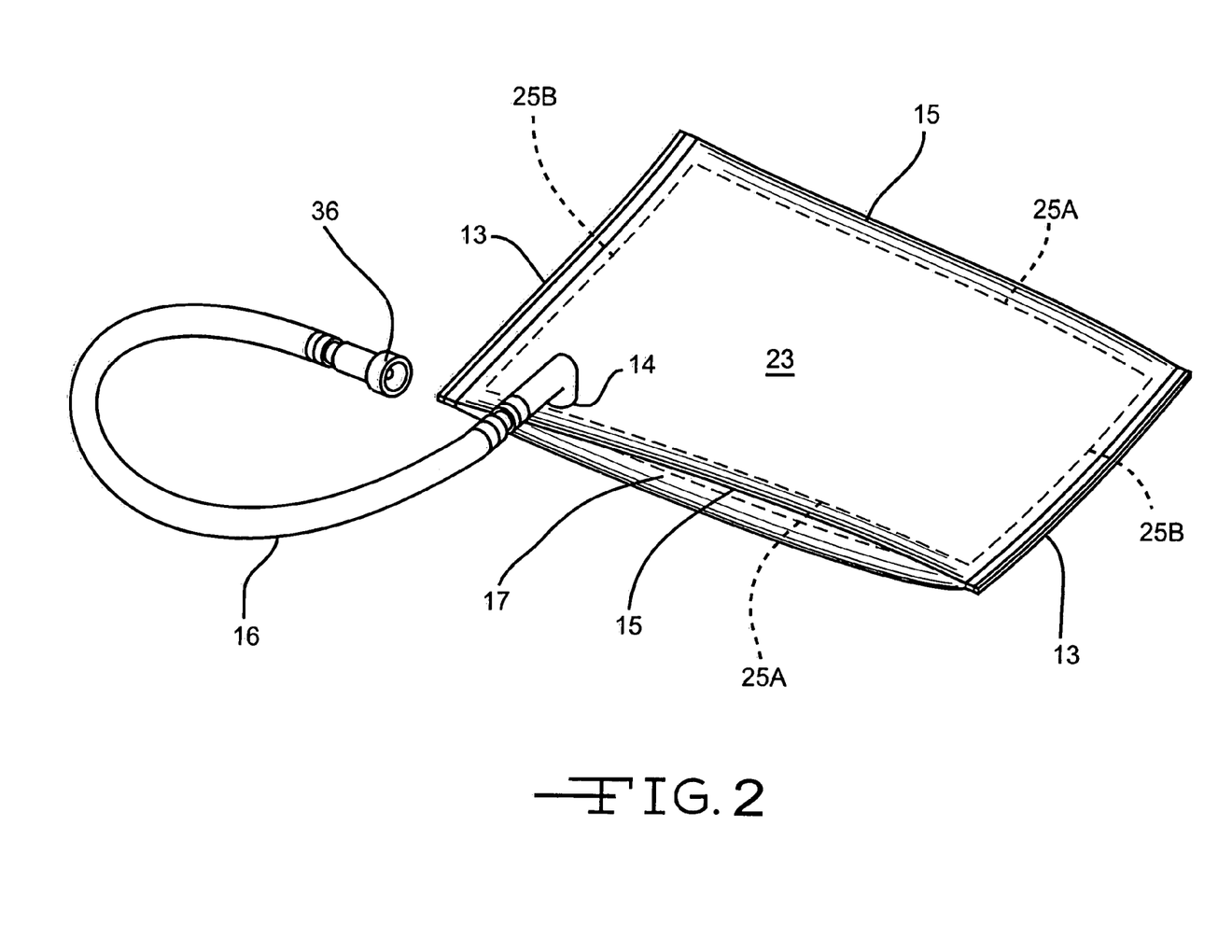
FIG. 2 is a view similar to FIG. 1 taken from the opposite side.
Figure 3:
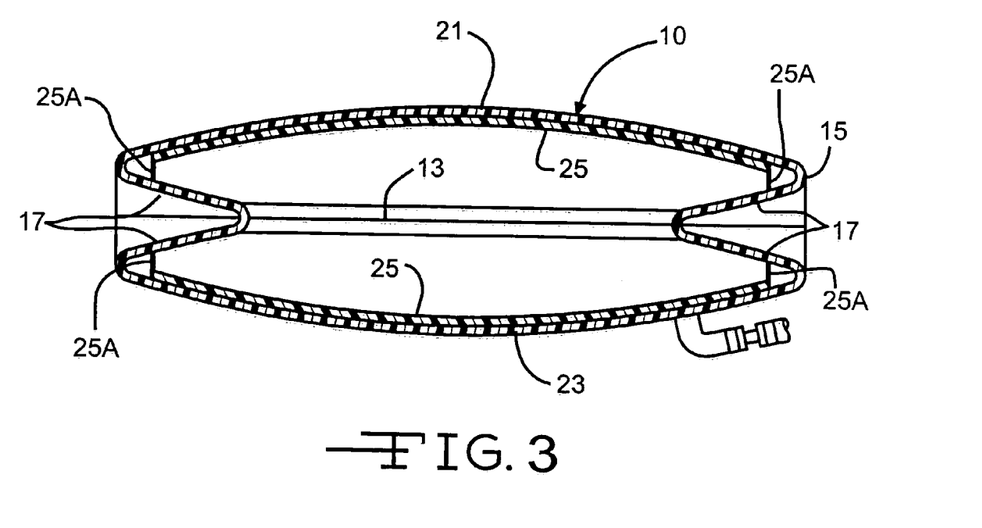
FIG. 3 is a sectional view taken through line 3-3 of FIG. 1.

Because of the flexibility of the side walls 21 and 23 which permit the bag 10 to collapse upon itself upon dispensing of fuel therefrom, it is not necessary to provide a vent in the closure C sealing the fuel in the bladder bag 10. This is highly advantageous in that the collapsing of the bladder bag 10 prevents a build up of potentially explosive fumes above the fuel as in the case of dispensing fuel from a rigid container such as a metal or molded tank. The feature of the stiffening members 25 having a lateral extent from one edge 25A to the opposing edge 25A which are spaced from the pleats 17 results in the bag 10 being collapsible irrespective of whether the stiffener members 25 are utilized.

Figure 4:
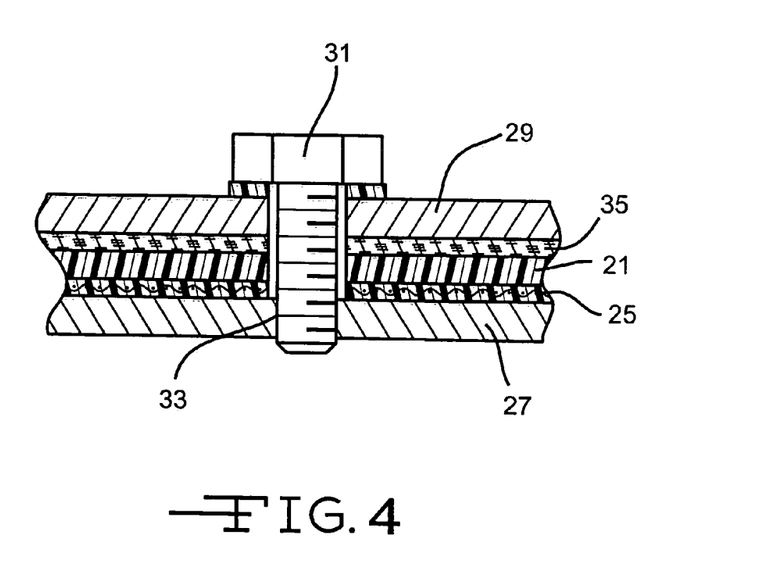
FIG. 4 is a sectional view taken through line 4-4 of FIG. 1.

Referring to FIGS. 1 and 4, the receiving nozzle 19 has a neck 22, a portion of which extends inwardly into the interior of the bladder bag 10 and has a radially outwardly extending flange 27 for engaging the interior surface of the upper wall 21. A circular metal plate 29 encircles the nozzle 19 on the exterior side of the upper wall 21. A plurality of bolts 31 extend through apertures of the metal plate 29 and engage threaded apertures 33 of the flange 27 to thereby sealing clamp the nozzle 19 onto the upper wall 21 of the bladder bag 10. If desired, for additional sealing security, a cork seal 35 may be positioned between the metal plate 29 and the upper wall 21. As can be seen in FIG. 4, the stiffener member 25 is between the interior surface of the upper wall 21 and the flange 27.

As shown in FIG. 2, the hose 16 delivers fuel from the outlet opening 14 in the lower wall and may be secured by any desired means.

Figure 5:
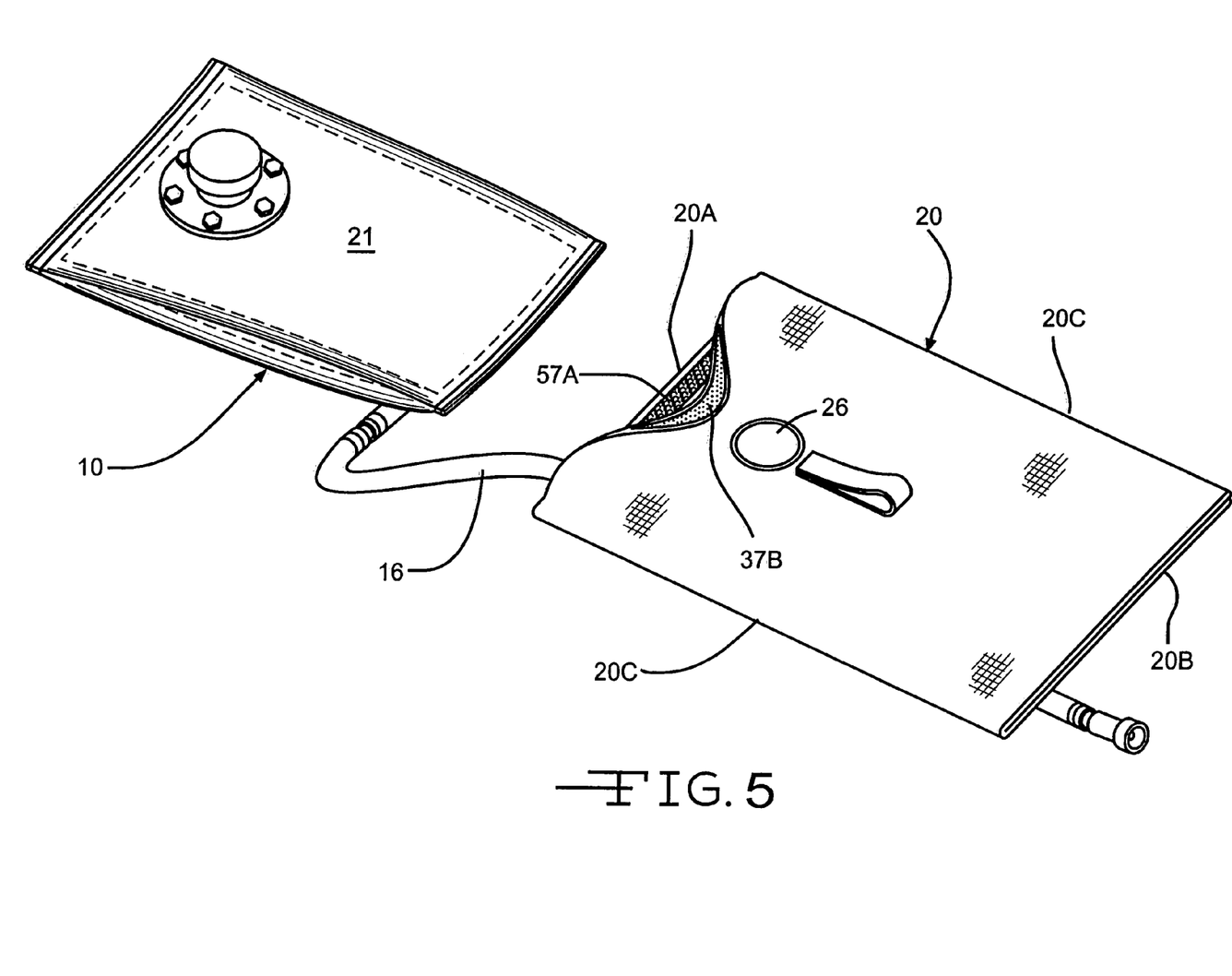
FIG. 5 is an exploded view showing the inner bladder bag and a first outer fire retardant bag about to receive the inner bladder bag.
Figure 6:
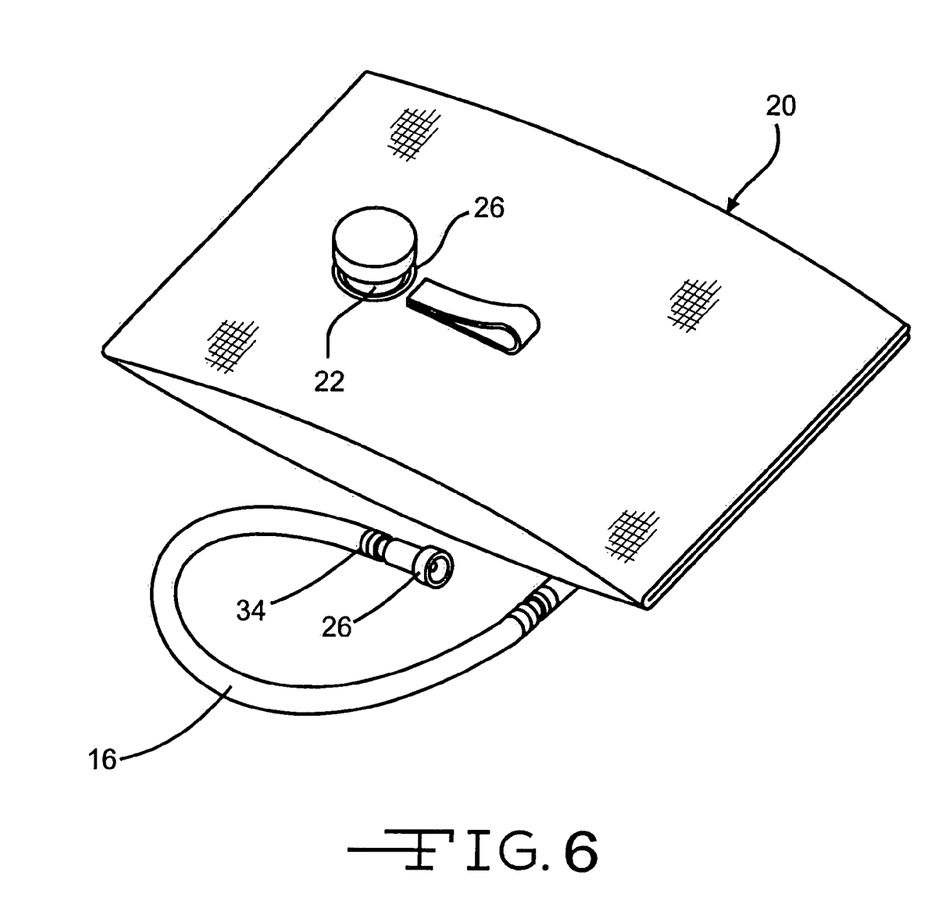
FIG. 6 is a perspective view showing the combination of the inner bladder bag retaining the fuel and the first outer fire retardant bag.

Referring to FIGS. 5 and 6, the bladder bag 10 is contained in a fire retardant cloth bag 20 which may be manufactured from Nomex® or other suitable fire retardant material. The fire retardant cloth bag 20 has a first aperture 26 through which the neck 22 of the bladder bag 10 may extend and a second aperture (not shown) on the opposite side through which the hose 16 may extend. The cloth bag 20 is slightly larger than the bladder bag 10 and has an open end 20A for receiving the bladder bag 10, a closed end 20B and a pair of parallel side edges 20C which are also closed. The open end 20A is provided with mating Velcro® strips 37A and 37B for closing the open end 20A following placement of the bladder bag 10 in the cloth bag 20.

Figure 7:
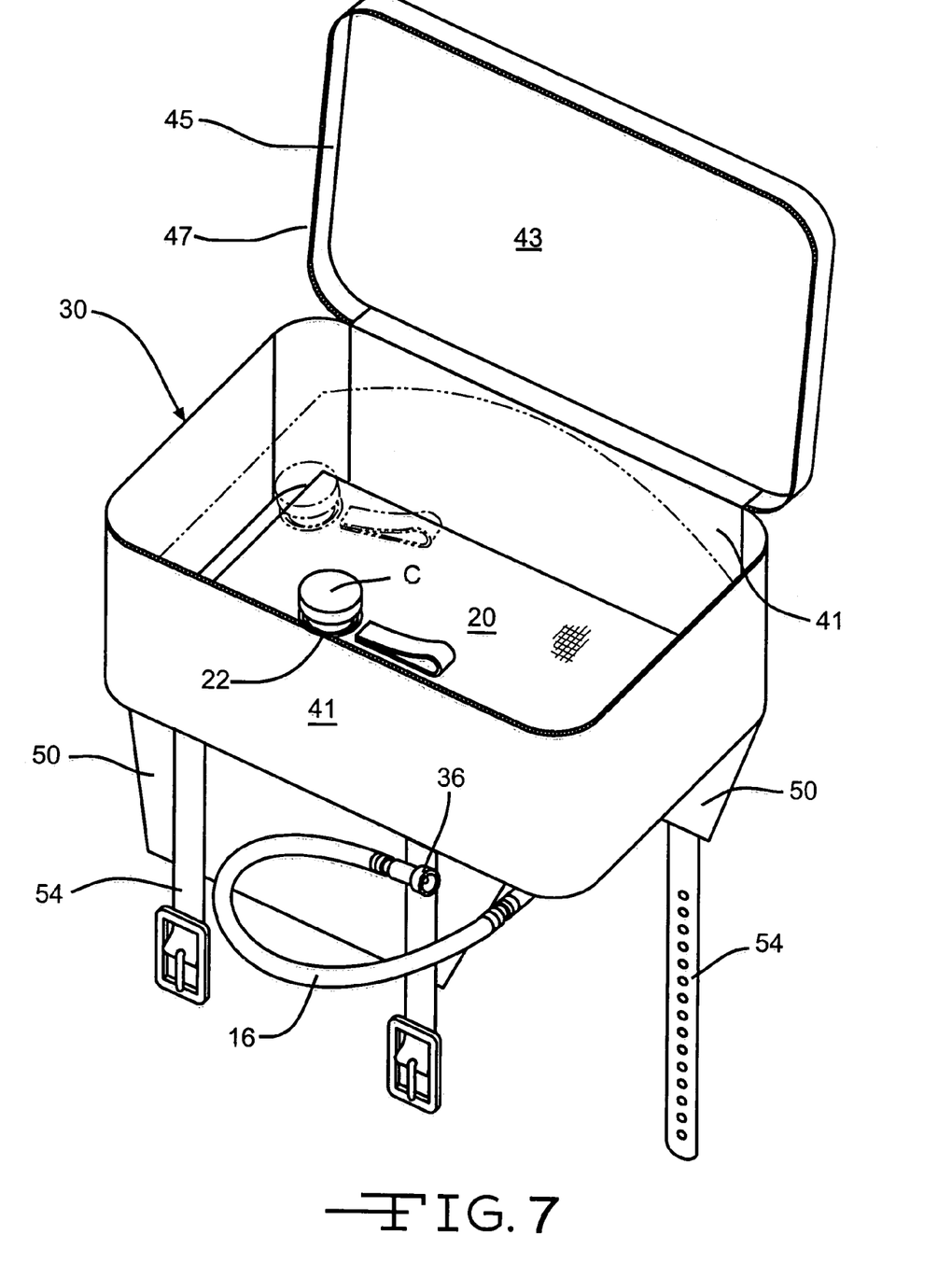
FIG. 7 is a perspective view of a second outer bag receiving the combination of the inner bladder bag and the first outer bag and showing straps for retaining it on a vehicle.
Figure 8:
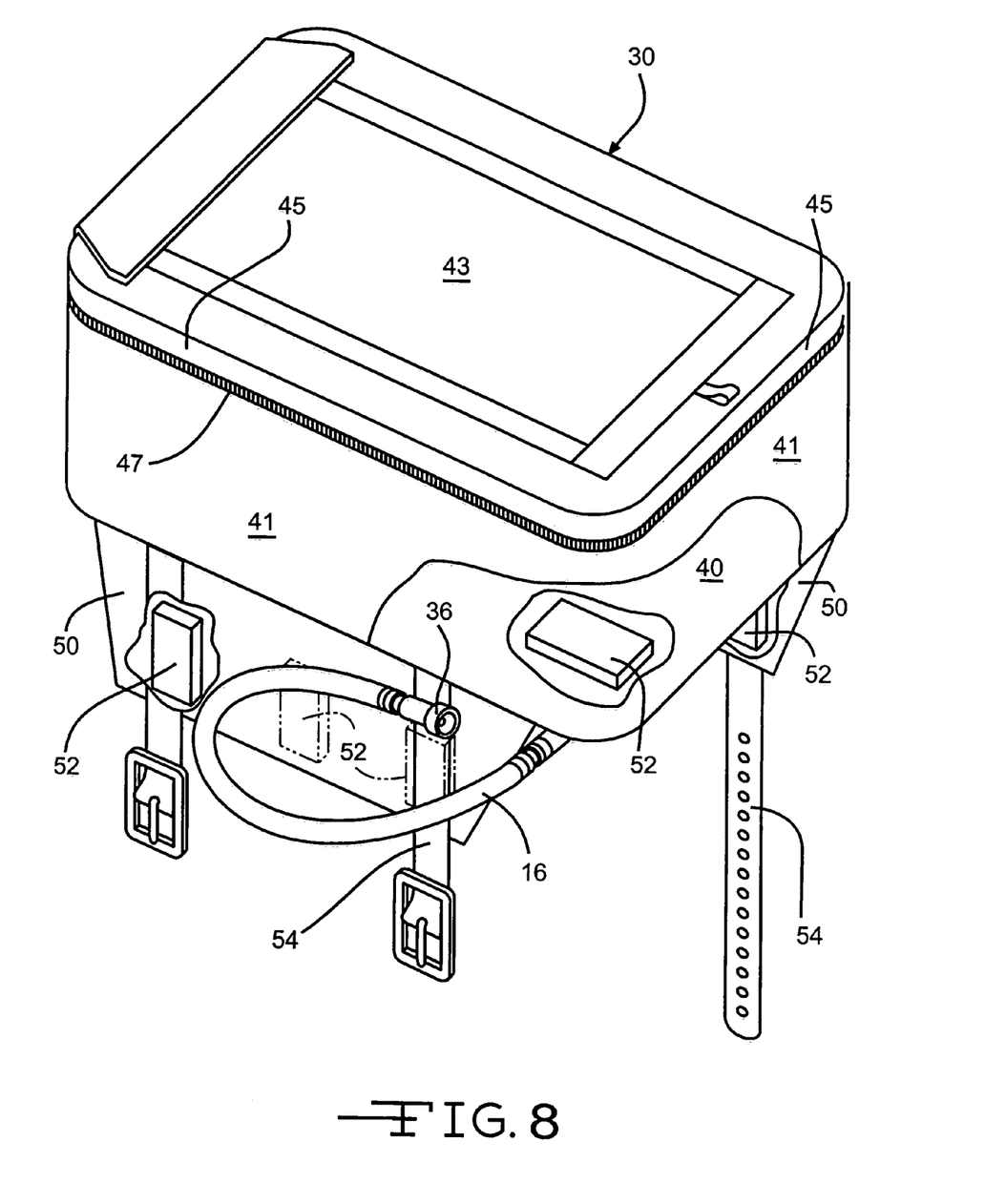
FIG. 8 is a view similar to FIG. 7 showing the second outer bag closed and showing schematically magnets for retaining it on a vehicle.

Referring to FIGS. 7 and 8, the combination of the bladder bag 10 sealed in the Nomex® fire retardant cloth bag 20 is inserted in a puncture and abrasion resistant armor receptacle 30 manufactured of a suitable puncture resistant and abrasion resistant material such as Kevlar®. The receptacle 30 is provided with an aperture (not shown) through which the hose 16 may extend. The receptacle 30 includes a compartment defined a bottom 40 and a wall 41 extending upwardly therefrom which define a generally rectangular shape of a size to readily receive the combination of the fire retardant cloth bag 20 with the bladder bag 10 contained therein with sufficient space for expansion of the bladder bag 10 as it is filled with fuel.

A lid 43 is hingedly connected to a rear portion of wall 41. The lid 43 has a downwardly extending wall portion 45 which is sized to mate with the upstanding wall 41. The upstanding wall 41 and downwardly extending wall portion 45 are provided with a zipper 47 for closing the lid 43. FIG. 7 shows in full lines the positioning of the cloth bag 20 and the neck 22 and closure C of the bladder bag 10 contained therein when the bladder bag is empty. Shown in phantom lines is the position of the respective parts when the bladder bag 10 is filled with fuel.

Figure 9:
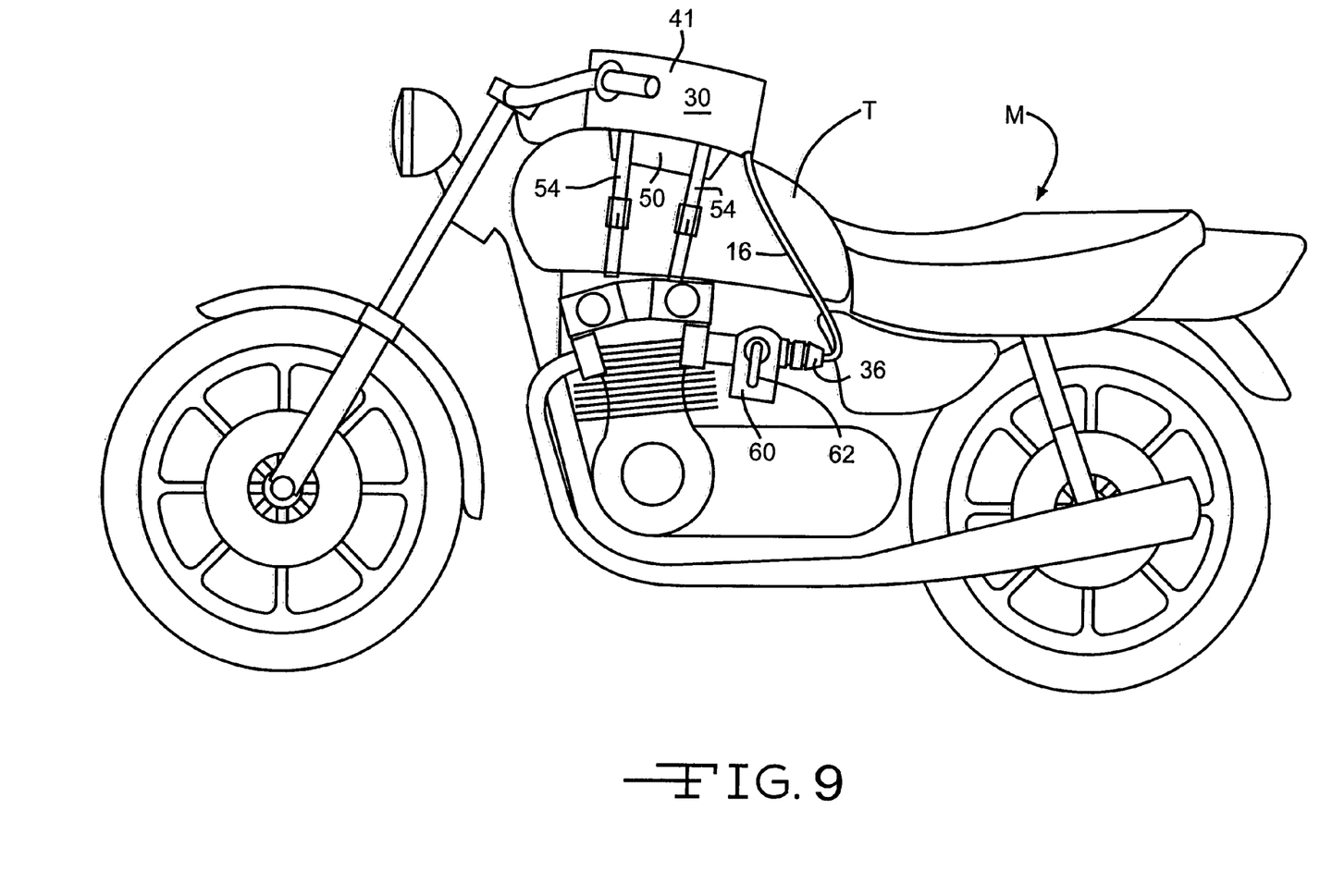
FIG. 9 is a side view of a motorcycle in combination with the portable fuel system secured thereto.

Referring to FIG. 8, extending downwardly from the bottom 40 at opposite sides of the upstanding wall 41 are a pair of flaps 50 in which are positioned a plurality of magnets 52 which may be used to engage the metal tank or other portion of the motorcycle for supporting the assembly thereon. Magnets 52 may also be positioned in the bottom 40. Additionally, straps 54 are provided for firmly securing the assembly to the motorcycle. This may be seen in FIG. 7 and in FIG. 9 which shows a motorcycle M having a built-in metal fuel tank T. The portable fuel system of the present invention comprising the armor receptacle 30 with the combination bladder bag 10 and fire resistant cloth bag 20 therein is resting upon the tank T. The bottom 40 and flaps 50 rest upon the metal tank T with the magnets 52 being in sufficiently close proximity to the metal of the tank (even though separated therefrom by a layer of fabric) to be magnetically engaged thereto. Only one flap 50 is shown in FIG. 9 with the other flap extending downwardly from the bottom adjacent the opposed portion of the upstanding wall 41 and engaged to the other side of the tank T. Although tests have shown that the magnetic force is sufficient to retain the armor bag 30 and other components received therein of the portable fuel system, it is also desirable to secure such system to the motorcycle M by means of the straps 54.

As can be seen in FIG. 9, the quick disconnect coupling 36 at the end of the tubing 16 is connected to a switch cock valve 60 having a handle 62. The switch cock valve 60 is connected also to the main tank T and to the carburetor of the motorcycle M. The switch cock valve 60 is conveniently located so that the rider can easily grasp the handle 62 while the motorcycle is moving to move it from a position at which the valve 60 is directing fluid from the main tank T to the carburetor to a position at which it is directing fuel from the portable fuel system and its bladder bag 10 to the carburetor.

Although the portable fuel system of the present invention has been described for use with a motorcycle, it can also be used with a wide variety of other types of vehicles including but not limited to all terrain vehicles (ATVs), snow mobiles and water jet skis.

A variety of modifications will be readily apparent to those skilled in the art. Accordingly, the scope of the present invention should be determined solely by the scope of the appended claims.

I claim:

1. A combination comprising
   (a) a vehicle with a fuel powered motor; and
   (b) a portable fuel system including
      (i) a collapsible inner bag having at least one aperture for receiving or dispensing fuel;
      (ii) a closure for opening and closing said aperture; and
      (iii) a first outer bag encircling a major portion of said inner bag, said first outer bag being formed of fire retardant material.

2. The combination according to claim 1 further including a second outer bag for receiving said inner bag and first outer bag and magnet means within said second outer bag, said magnet means providing magnetic attraction to said vehicle.

3. The combination according to claim 1 further including a second outer bag for receiving said first inner bag and first outer bag and means on said second outer bag for securing said second outer bag to said vehicle.

4. The combination according to claim 1 further including a nozzle extending through said aperture interiorly to exteriorly of said inner bag.

5. The combination according to claim 4 wherein said aperture is in an upper wall of said inner bag and wherein said inner bag has a lower wall downwardly therefrom and further including an aperture in said lower wall and a hose for directing fuel from said inner bag lower wall aperture to said vehicle.

6. The combination according to claim 5 wherein said vehicle has a fuel tank mounted thereon and further including a valve movable from a first position directing fuel from said mounted fuel tank to said motor to a second position directing fuel from said hose to said motor.

7. The combination according to claim 4 wherein said inner bag has a first wall with an interior surface and further including a stiffener member engaged to said interior surface.

8. The combination according to claim 4 wherein said inner bag aperture is in a first wall and said nozzle includes an outwardly extending flange on one side of said first wall and further including a clamping member on the other side of said first wall and fastening members securing said clamping member to said flange with said first wall therebetween.

9. The combination according to claim 4 further including a closure on said nozzle, said closure being non-vented.

10. The combination according to claim 1 wherein inner bag has a first wall portion, a second wall portion and edges between said first and second wall portions and further including a first stiffener member on the interior surface of said first wall portion and a second stiffener member on the interior surface of said second wall portion.

11. The combination according to claim 10 wherein at least one of said edges is pleated.

12. The combination according to claim 1 wherein said inner bag has a first wall with an interior surface, a second wall with an interior surface and spaced apart first and second edges extending between said first and second walls, at least one of said edges being pleated.

13. The combination according to claim 12 further including a stiffening member on at least one of said first wall interior surface and said second wall interior surface.

14. The combination according to claim 12 further including a second outer bag for receiving said inner bag and said first outer bag and means for securing said second outer bag to said vehicle.

15. The combination according to claim 14 wherein said means for securing comprises magnets retained in one or more portions of said second outer bag.

16. The combination according to claim 14 wherein said means for securing comprises one or more straps.

17. The combination according to claim 12 further including a nozzle extending through said aperture interiorly to exteriorly of said inner bag.

18. The combination according to claim 17 further including a stiffener member engaged to said interior surface encircling said nozzle.

19. The combination according to claim 17 wherein said nozzle includes an outwardly extending flange on one side of said first wall and further including a clamping member on the other side of said first wall and fastening members securing said clamping member to said flange with said first wall therebetween.

20. The combination according to claim 19 further including a stiffener member between said first wall and said clamping member.

21. The combination according to claim 20 wherein said stiffener member encircles said nozzle and further including a second stiffener member on the interior surface of said second wall.

22. The combination according to claim 17 further including a closure on said nozzle, said closure being non-vented.

23. A combination comprising
   (a) a fuel powered motorized vehicle; and
   (b) a portable fuel system including
      (i) a collapsible inner bag having at least aperture for receiving or dispensing fuel;
      (ii) a closure for opening and closing said aperture;
      (iii) a first outer bag encircling a major portion of said inner bag, said first outer bag being formed of fire retardant material; and
      (iv) a second outer bag for receiving said inner bag and said outer bag and further including means for supporting said second outer bag on said vehicle.

24. A portable fuel system for a vehicle with a fuel powered motor comprising:
   (a) a collapsible inner bag having an upper wall with a first aperture for receiving fuel and a lower wall with a second aperture for dispensing fuel;
   (b) a closure for opening and closing said first aperture;
   (c) a tubular member for directing fuel from said second aperture to said vehicle;
   (d) a first outer bag encircling a major portion of said inner bag, said first outer bag being formed of fire retardant material; and
   (e) a second outer bag for receiving said inner bag and first outer bag.

25. The system according to claim 24 further including means on said second outer bag for securing said second outer bag to said vehicle.

26. The system according to claim 24 further including magnet means within said second outer bag, said magnet means providing magnetic attraction to said vehicle.

27. The system according to claim 24 further including a nozzle extending through said first aperture interiorly to exteriorly of said inner bag.

28. The system according to claim 27 further including a closure on said nozzle, said closure being non-vented.

29. The system according to claim 24 wherein said inner bag upper wall has an interior surface and further including a stiffener member engaged to said interior surface.

30. The system according to claim 24 wherein said inner bag has edges between said upper and lower wall portions and further including a first stiffener member on the interior surface of said upper wall and a second stiffener member on the interior surface of said lower wall.

31. The system according to claim 30 wherein at least one of said edges is pleated.

32. The system according to claim 24 wherein said inner bag has spaced apart first and second edges extending between said upper and lower walls, at least one of said edges being pleated.

33. The system according to claim 32 further including a stiffener member on at least one of said upper wall interior surface and said lower wall interior surface.

34. The system according to claim 32 wherein said stiffener member is spaced from said edges.

* * * * *